US008437557B2

(12) United States Patent
Kaushal et al.

(10) Patent No.: US 8,437,557 B2
(45) Date of Patent: May 7, 2013

(54) AUTO CLASSIFYING IMAGES AS "IMAGE NOT AVAILABLE" IMAGES

(75) Inventors: Nabeel Kaushal, Seattle, WA (US); Feng Qi, Los Angeles, CA (US); Marcelo De Barros, Redmond, WA (US); Manish Mittal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 465 days.

(21) Appl. No.: 12/777,695

(22) Filed: May 11, 2010

(65) Prior Publication Data

US 2011/0280474 A1 Nov. 17, 2011

(51) Int. Cl.
*G06K 9/62* (2006.01)
*G06K 9/00* (2006.01)
*G06K 9/46* (2006.01)
*G06Q 30/00* (2012.01)
*G06F 3/00* (2006.01)

(52) U.S. Cl.
USPC .......... 382/224; 382/165; 382/190; 705/27.1; 715/700

(58) Field of Classification Search .................. 382/224, 382/165, 190; 705/27.1; 715/700
See application file for complete search history.

(56) References Cited

U.S. PATENT DOCUMENTS

| 6,092,059 | A | 7/2000 | Straforini et al. |
| 6,256,408 | B1 * | 7/2001 | Casey et al. .................... 382/170 |
| 7,266,522 | B2 * | 9/2007 | Dutta et al. ...................... 705/37 |
| 7,657,089 | B2 | 2/2010 | Li et al. |
| 2005/0099518 | A1 * | 5/2005 | Mihara et al. ............ 348/333.05 |
| 2007/0116360 | A1 | 5/2007 | Jung et al. |
| 2008/0074644 | A1 | 3/2008 | Levenson et al. |
| 2009/0252413 | A1 | 10/2009 | Hua et al. |
| 2009/0316986 | A1 | 12/2009 | Hua et al. |
| 2009/0324051 | A1 | 12/2009 | Hoyt et al. |

OTHER PUBLICATIONS

Sergyan, S., "Color Content-based Image Classification," 5th Slovakian-Hungarian Joint Symposium on Applied Machine Intelligence and Informatics, Jan. 25-26, 2007, http://old.bmf.hu/conferences/sami2007/42_Sergyan.pdf.
Nishii, R., "Supervised Image Classification Based on Statistical Machine Learning," SPIE 2010, Mar. 6, 2007, http://spie.org/x8543.xml?ArticleID=x8543.

* cited by examiner

*Primary Examiner* — Kathleen Y Dulaney
(74) *Attorney, Agent, or Firm* — The Law Office of Michael E. Kondoudis (57) ABSTRACT

An image may be accepted from a vendor, and the image may be submitted to an image analysis system. The image analysis system may determine whether the image is a not found image or a true image. The determination may occur in a variety of ways by examining the color and intensity characteristics of an image. After the analysis, a determination is received from the image analysis system of whether the image is a not found image or a true image.

17 Claims, 6 Drawing Sheets

AUTO CLASSIFYING IMAGES AS "IMAGE NOT AVAILABLE" IMAGES

BACKGROUND

This Background is intended to provide the basic context of this patent application and it is not intended to describe a specific problem to be solved.

Images are useful in the electronic world to help illustrate goods and services for sale. Images are stored as bits of data and can be easily communicated electronically. However, the number of goods and services for sale is large and is ever expanding. Trying to keep accurate electronic images of all available goods and services is an overwhelming task. In response, if an image is not available, vendor often substitute an image that states "Image not Found" often as part of a bland illustration. Displaying an "Image not Found" image is not attractive to users and may make a seller appear unprofessional or not polished.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computer based method of determining whether an image is a true image or a not found image is disclosed. An image may be accepted from a vendor, and the image may be submitted to an image analysis system. The image analysis system may determine whether the image is a not found image or a true image. The system may be "trained" using pre-classified images. In one way, the intensity and color and other image related statistics are reviewed and if the image analysis system output are not over a threshold, the image is categorized as an image not found image. If the image is determined to be a true image, the image is displayed. If the image is determined to be a not found image, the image is not displayed.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '________' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
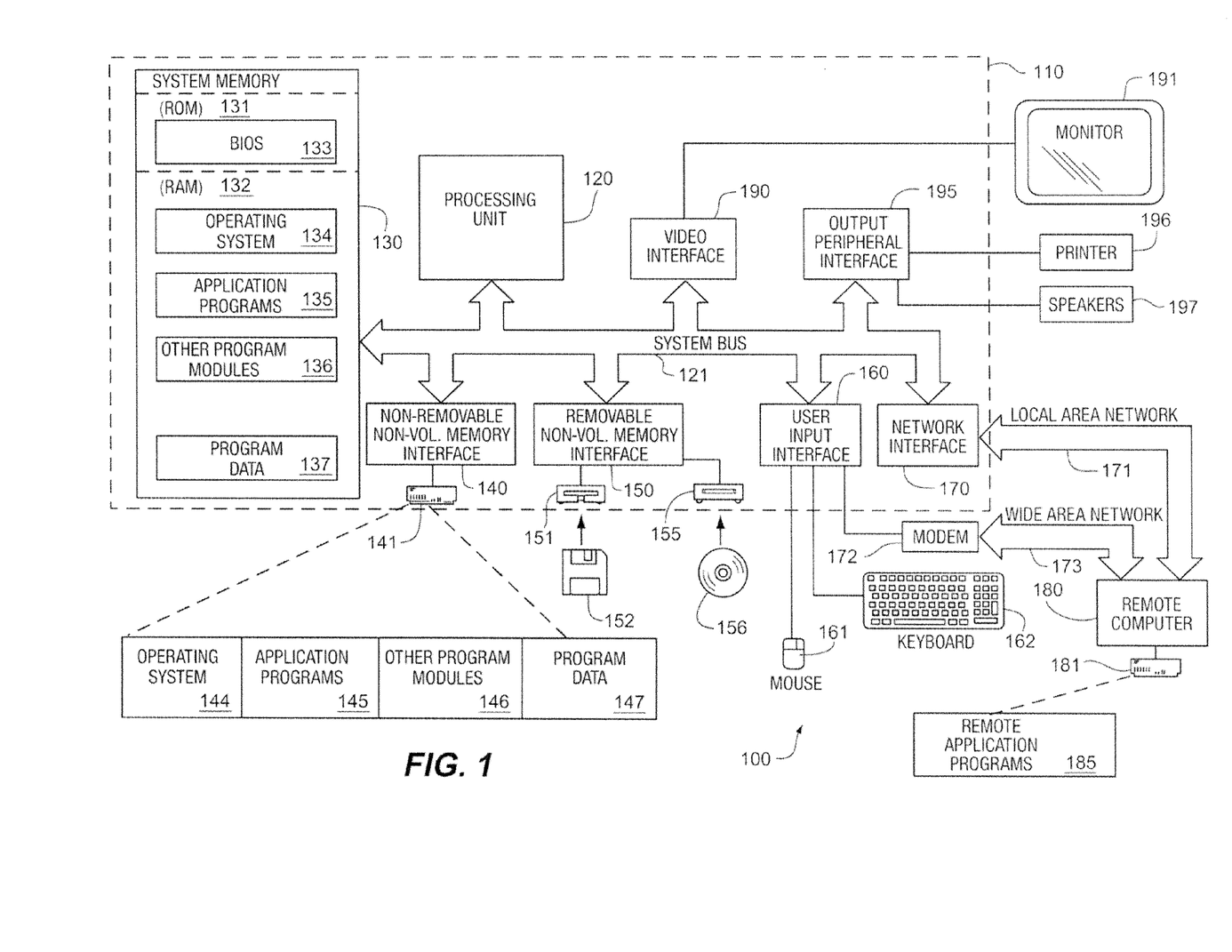
FIG. 1 is an illustration of a computing device.

FIG. 1 illustrates an example of a suitable computing system environment 100 that may operate to execute the many embodiments of a method and system described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 195.

Figure 2:
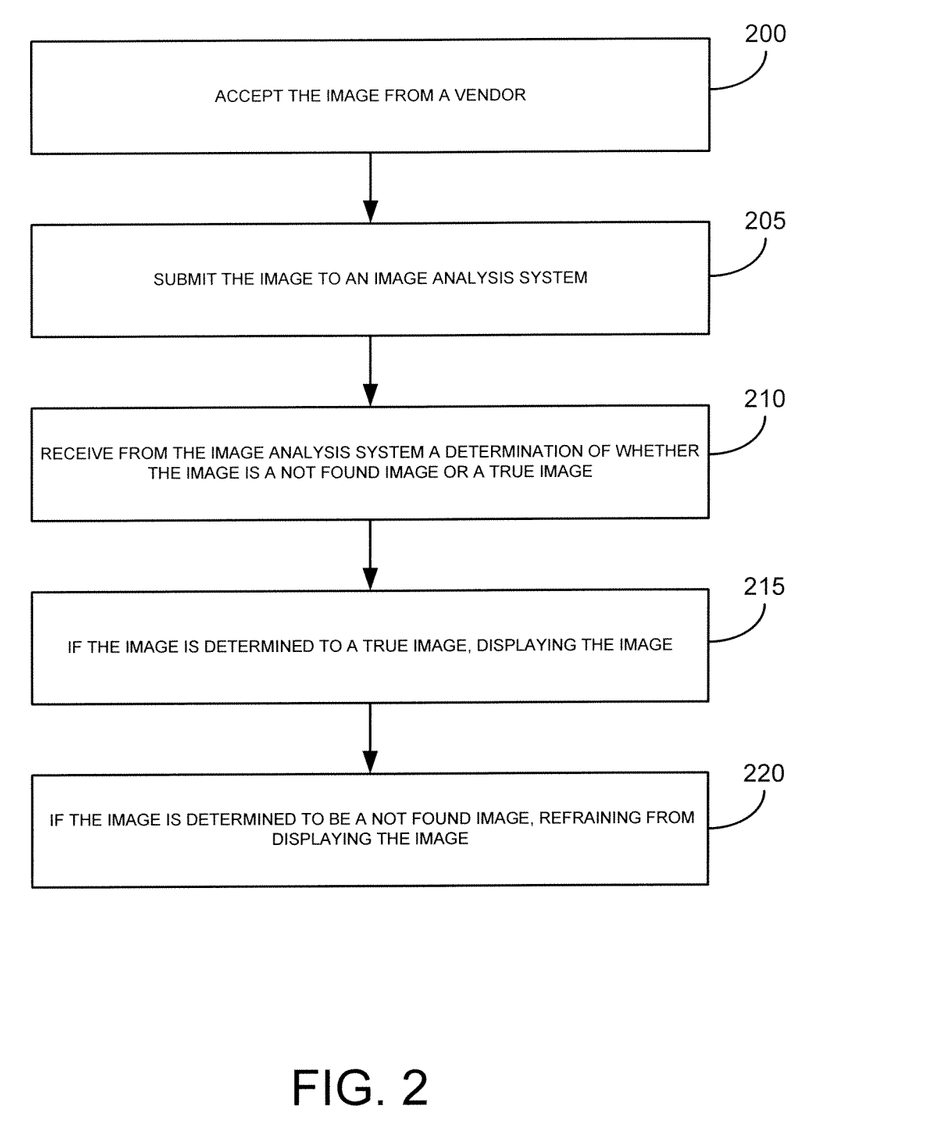
FIG. 2 is an illustration of a method of determining whether an image is a true image or a not found image.
Figure 3:
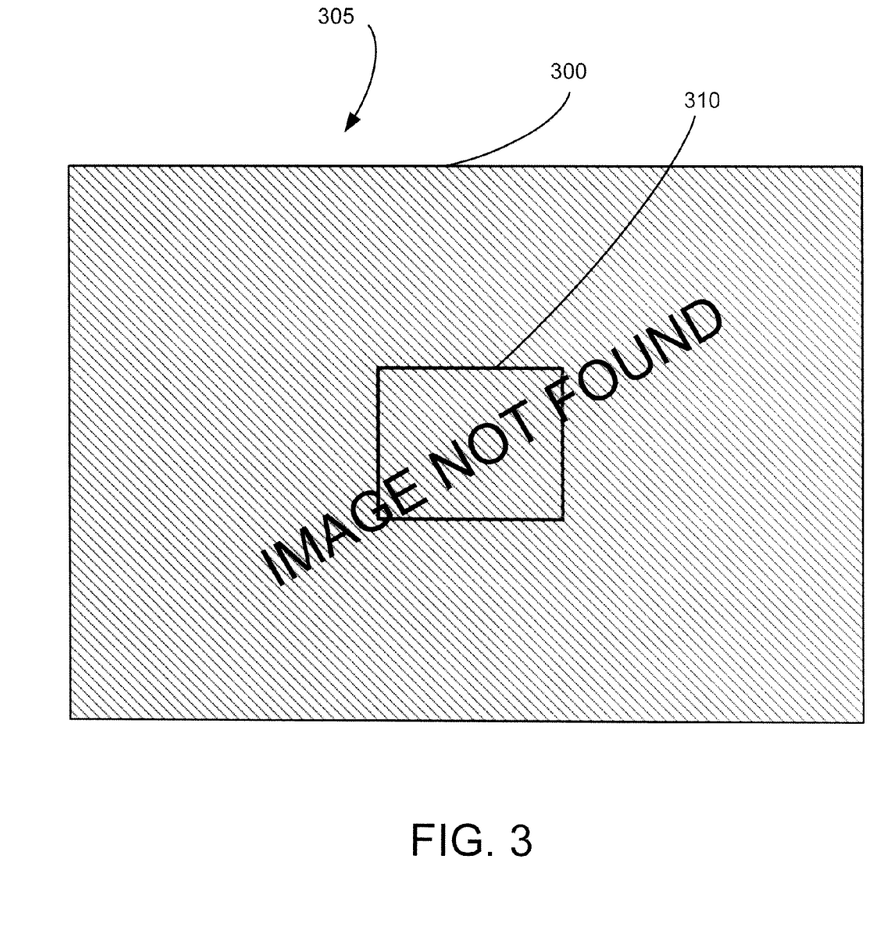
FIG. 3 is an illustration of an image not found image.

FIG. 2 is an illustration of a method of determining whether an image is a true image or a not found image 300 (FIG. 3). A not found image 300 is an image that in some way indicates that an image is not available. Common not found images 300 have a display in some manner that communicates that the desired image is not available. The not found image 300 is usually a placeholder for the desired image and is displayed when the desire image is unavailable. The desired image may be unavailable for a variety of reasons, such as an item is new and no image is available or that the seller does not keep images for every product it may sell. Instead of showing a "red x" or an empty file, sellers often insert an image that may be interesting but may also indicate that the desired image is not available 300.

From an electronic retailing point of view, displaying an image not found image 300 may be undesirable. The image not found 300 may be unattractive and may make a retailer's web site appear unprofessional. If an image may not be available, it may be preferable to not display any image rather than an image not available image 300 generated by a seller. In the past, retailers would have to determine whether an image 305 is an image not found image 300 by visually inspecting it which is slow and inefficient. Another attempt has been to try to create a list of images not found, and then determine if the image 305 matches an image in this list. The downside of this approach is that vendors may frequently introduce new not found images that the retailer continually needs to somehow detect and add to the list. Accordingly, it may be desirable to electronically determine whether an image is likely an image not found image 300 to save worker time and to have a more attractive web site.

At block 200, the image 305 may be accepted from a vendor. The image 305 may be communicated in any modern manner such as part of a structured data file or as a separate communication. The image 305 may even be delivered on a physical medium or may be pulled from a pre-existing database located locally or remotely. In yet another embodiment, the communication may be a pointer to a location where the image 305 may be accessed. Of course, additional manners of communicating the image 305 are possible and are contemplated.

At block 205, the image 305 may be submitted to an image analysis system. The image analysis system may determine whether the image 305 is a not found image 300 or a true image. The image analysis system may make the determination in a variety of ways.

Figure 4:
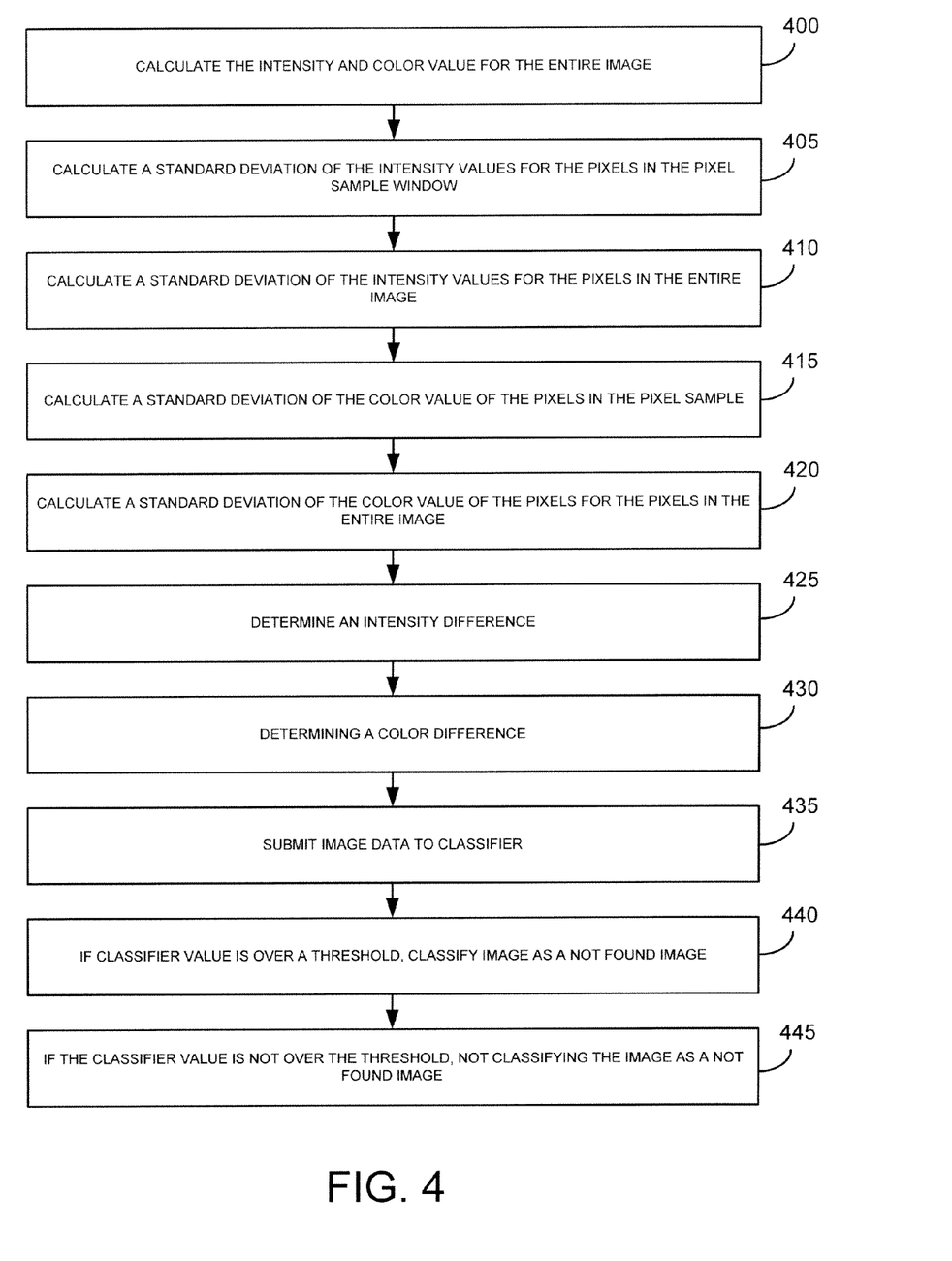
FIG. 4 illustrates one sample method that uses additional statistics to determine whether an image is a true image or an image not found image.

FIG. 4 may illustrate one sample method that uses statistics to determine whether an image 305 is a true image or an image not found image 300. The image 305 may be accepted at the image analysis system. The image may be accepted in any traditional manner, such as part of a file, a pointer to a file, via a physical medium, etc. At block 4005, an intensity value for the image 305 may be determined. The intensity value may be an average of a pixel's red, green and blue values or may be the red, green and blue values of the entire image 305. The scale of the intensity value may not be critical as long as the same scale is used for each color value. The color value may be obtained from the image 305 itself or may be a measured value. Of course, other manners of obtaining an intensity value are possible and are contemplated.

Also at block 400, a color value for the image 305 may be determined. Many not found images 300 do not have much color variation or much color intensity. The not found images 300 are usually mono-color or have minimal color variation. By studying the color and intensity variation, it may be determined whether an image 305 is an image not found image 300. Determining the color value may be the sum of the red, green blue deviations from intensity for a pixel or for part or all of the image 305. In other words, the color value may be the absolute value of the difference of a color value for the pixel and the intensity value for the pixel (or the entire image 305 or part of the image). Mathematically:

$$\text{Color value} = [ABS(\text{val} - \text{intensity})]$$

Of course, other manners of determining a color value are possible and are contemplated.

In one embodiment, the intensity and color value for every pixel in the image 305 is calculated. In another embodiment, a statistically significant sample of the pixels that make up the entire image 305 may be reviewed for intensity and color values.

At block 405, a standard deviation of the intensity values for the pixels in the pixel sample window 310 may be calculated. Standard deviation is a widely used measure of the variability or dispersion and it shows how much variation there is from the "average" (mean). A low standard deviation indicates that the data points tend to be very close to the mean, whereas high standard deviation indicates that the data are spread out over a large range of values.

At block 410, a standard deviation of the intensity values for the pixels in the entire image 305 may be calculated. At block 415, a standard deviation of the color value of the pixels in the pixel window 310 may be calculated. At block 420, a standard deviation of the color value of the pixels for the pixels in the entire image 305 may be calculated. Of course, different parts and sizes of the image 305 may be used and is contemplated.

In some other embodiments, the entire image 305 may be studied. In other embodiments, a random sample of a certain percentage of the pixels in the image may be studied. In yet another embodiment, a pixel sample window 310 may be selected from an area that is centered at ½ the height of the window and ½ the width of the entire image. In one embodiment, the window 310 may be less than 10% of the entire image area and the intensity and color value are calculated for the sample window 310. In other embodiments, the pixel sample window 310 may be a different percentage of the entire image 305. The percentage may be set by an administrator or may be set through training such as the training as described in FIGS. 5 and 6.

At block 425, an intensity difference may be determined. The intensity difference may be a difference between the standard deviation of the intensity values for the pixels in the pixel sample window 310 and for the pixels in the entire image 305. In many image not found images 300, the intensity difference may be low from the center to the outer edge. The method may try to take a sample of a center part of the image 310 and compare it to the outer edges.

At block 430, a color difference may be determined. The color difference may be a difference between the standard deviation of the color value of the pixels in the pixel window 310 and for the pixels in the entire image 305. In many image not found images 300, the color difference may be low from the center to the outer edge. The method may try to take a sample of a center part of the image as the sample window 310 and compare it to the outer edges of the entire image 305.

At block 435, the image data is submitted to a classifier. The image data may include the values calculated in blocks 400-430 and may include attributes such as the intensity, the color value, the standard deviations of the intensity values in different parts of the image, the standard deviations of the intensity values in different parts of the image, etc. The classifier may be a function that evaluates the image data and outputs a classification value that relates to the confidence that an image is a not found image. The classifier may have a formula to evaluate the image data. For example, in one embodiment, the formula may apply weights to the different attributes of the image data to make a determination at whether an image is a not found image. The weights may be set by an administrator or may be determined through training as described in FIG. 5. As an example, the color value, intensity value, color standard deviation and intensity standard deviation may be normalized to be between 0 and 1. Each attribute may be given a 25% weight and the end result will be a number between 0 and 1. The threshold for determining if an image is a not found image may be 0.7. Of course, other manners of evaluating the image data are possible and are contemplated.

At block 440, if the classifier output is over the threshold, the image 305 may be classified as a not found image 300. The threshold may be set by an administrator or may be adjusted over time. In another embodiment, the threshold may be adjusted by training the method as described in relation to FIG. 6. At block 445, if the classifier output is not over the threshold, the image 305 may not be classified as a not found image 300.

In one embodiment, the intensity value and color values may be broken into intervals and only certain intervals are reviewed. For example, the color values may be broken into ten groups and common image not found images 300 may concentrate their colors in one or two of the ten groups. To speed processing and save memory, only the groups of interest may be reviewed.

Figure 5:
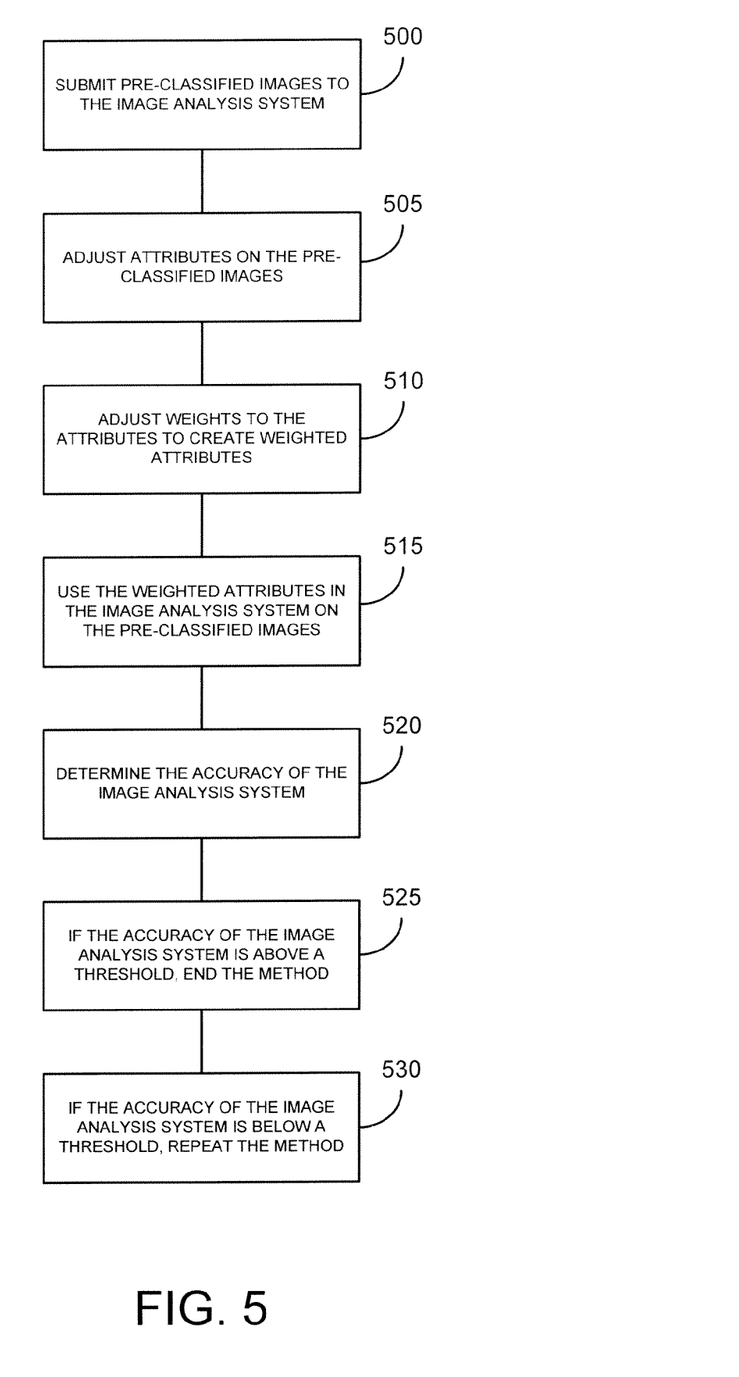
FIG. 5 illustrates one possible method of training the image analysis system.

In another embodiment, the image analysis system may uses a training set of data that has been pre-classified for training the image analysis system. FIG. 5 may illustrate one possible method of training the image analysis system. By training the image analysis system, better and faster results may be obtained.

At block 500, pre-classified images 305 may be submitted to the image analysis system. The images 305 may be submitted in any logical manner, such as part of a file, as a pointer to a file, etc. At block 505, attributes on the pre-classified images 305 may be adjusted. For example, the text in the image may be normalized or completely removed from the analysis system. In addition, attributes may be characteristic in the images 305. In some embodiments, the attributes may be the intensity of the image 305, the color of the image 305, the intensity of the pixel sample window 310, the colors of the pixel sample window 310, etc. Of course, other attributes may be relevant and may be contemplated.

At block 510, weights to the attributes may be adjusted to create weighted attributes. The may be an initial weight assigned to all the attributes. The initial weights may be equal or may vary based on predictions, past knowledge or guesswork.

At block 515, the weighted attributes may be used in the image analysis system on the pre-classified images 305. For example, if intensity of the image 305 is an attribute, the intensity of the image 305 may be determined and a weight may be applied to the intensity attribute. The weight may be high is there if a high correlation between intensity and whether an image 305 is an image not found image 300 and the weight may be lower if other attributes have higher correlations between being present and an image 305 being an image not found image 300.

At block 520, the accuracy of the image analysis system may be determined. The image 305 that is submitted will have a known classification. If the image analysis system has the same classification as the known classification, the image classification system may be accurate and if the classification of the system does not match the known classification, the system may have to be adjusted to be accurate. A sample adjustment may be adjusting the weights on the attributes, for example.

At block 525, if the accuracy of the image analysis system is above a threshold, the method may end. The threshold may set by an administrator or may be adjusted by a user or by the method itself. In some embodiments, a higher threshold may require more processing time while a lower threshold may require less processor time. Logically, at block 530, if the accuracy of the image analysis system is below a threshold, the method may repeat by continuing to adjust the weights on the attributes to obtain a desired accuracy.

A precision of the image analysis system may be determined by dividing total positive identifications by a number of total positive identifications and total false positives identifications. Similarly, a recall of the image analysis system may be determined by dividing the total positive identifications by a sum of total positive identifications and total false identifications. A higher precision may result in a lower recall and a higher recall may result in a lower precision. The threshold may be a number between 0 and 1 and may be adjustable to obtain a desired precision and recall. Of course, the scale can be adjusted with minimal effects.

The training in FIG. 5 may be accomplished in many ways. One way is described in FIG. 6. At block 600, n images may be obtained. The number of image n may be set in a variety of ways. If n is high, the accuracy of the image analysis system may be high but the training may take a significant amount of time and processor cycles. If n is low, the accuracy may be low but the training may be quick and less taxing on the processor.

Figure 6:
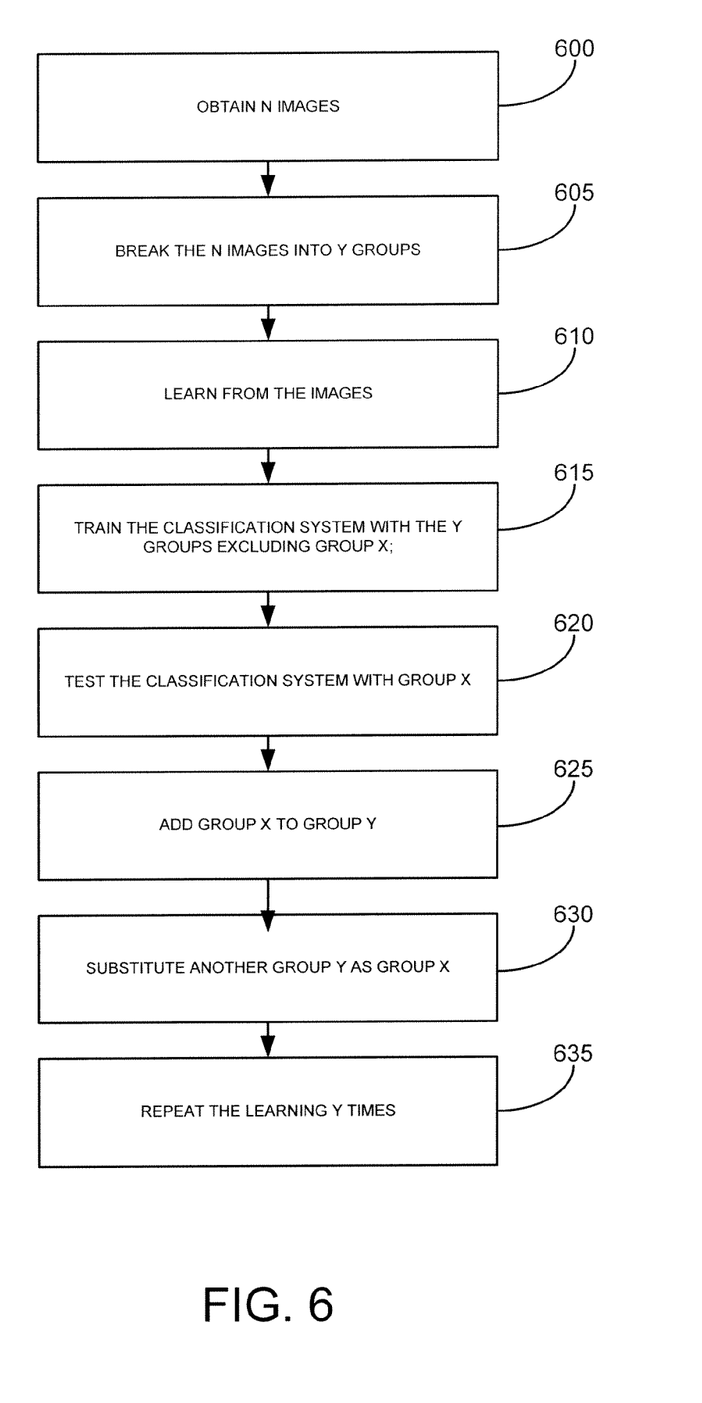
FIG. 6 illustrates another method of training the image analysis system.

At block 605, the n images may be broken into y groups. For example, if n is 200, the 200 images may be broken into 4 (y=4) groups of 50. In some embodiments, the groups are in equal size and in other embodiments, the groups are different sizes. The number of groups may be varied but it is useful to have a sufficient number of images to train and test the system.

At block 610, the method may learn from the images by withholding group x, where group x is one group of the y groups. For example, if there are 4 groups (y), 1 group (x) of the 4 groups (y) may be withheld. At block 615, the classification system may be trained with the y groups excluding group x. In the described example of 200 total images, there may be 3 groups of 50 images used for training and the withheld group of 50 may be used to test. At block 620, the classification system may be tested with the 50 images in group x. As such, 150 of the 200 total images may be used to train the system and 50 images may be used to test the classification system. By testing the system, the classification of the images may be known and the classification from the system may be compared to what is known. If the known classification and determined classification is high, the system is performing accurately.

At block 625, group x may be added back to group y and at block 630, another group from group y may be substituted as group x. In other words, the 50 images that were used to test the system will be used to train the system and a different group of 50 images will be used to test the system. At block 635, the training and testing may be repeated y times, with each group of 50 images being used to test the image system once and being used to train the system three times.

Referring again to FIG. 2, at block 210, a determination of whether the image 305 is a not found image 300 or a true image may be received from the image analysis system. In some embodiments, the determination may be binary (1 or 0, yes or no) while in other embodiments, the determination may be a decimal between 1 and 0. Of course, other method of indicating the results of the analysis system are possible and are contemplated.

At block 215, if the image 305 is determined to be a true image, the image 305 may be displayed and at block 220, if the image 305 is determined to be a not found image 300, the method may refrain from displaying the image 305.

As a result of the method, images from a vendor may be quickly analyzed and classified. Not found images 300 may not be displayed which may result in a better looking and more professional website. In addition, the classification may be accomplished quickly and efficiently with minimal human intervention.

In conclusion, the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The invention claimed is:

1. A computer based method of determining whether an image is a true image or a not found image comprising:
   accepting the image from a vendor;
   submitting the image to an image analysis system wherein the image analysis system determines whether the image is a not found image or a true image;
   receiving from the image analysis system a determination of whether the image is a not found image or a true image, the determination including:
      calculating an intensity value and a color value of an entire image of the image;
      calculating a standard deviation of intensity values of pixels of a pixel sample window of entire image, the pixel sample window a portion of the entire image;
      calculating a standard deviation of intensity values for pixels of the entire image;
      calculating a standard deviation of a color value of the pixels of the pixel sample window;
      calculating a standard deviation of a color value of the pixels of the pixels in the entire image;
      determining an intensity difference wherein the intensity difference comprises a difference between the standard deviation of the intensity values for the pixels in the pixel sample window and for the pixels in the entire image;
      determining a color difference wherein the color difference comprises a difference between the standard deviation of the color value of the pixels in the pixel sample window and for the pixels in the entire image;
      determining a classification value comprising applying weights to image attributes; and
   upon the classification value being under a threshold, classifying the image as the true image;
   upon the image being determined to be a true image, displaying the image; and
   upon the image being determined to be a not found image, refraining from displaying the image.

2. The method of claim 1, wherein the intensity comprises an average of a pixel's red, green and blue values.

3. The method of claim 2, wherein determining a color value comprises a sum of red, green and blue deviations from intensity for a pixel comprising an absolute value of the difference of a color value for the pixel and the intensity value for the pixel.

4. The method of claim 3, wherein a pixel sample window is selected from an area that is centered at ½ the height of the window and ½ the width of the entire image and is less than 10% of an area of the entire image and the intensity and color value are calculated for the pixel sample window.

5. The method of claim 1, wherein the intensity value and the color values are broken into intervals and only certain intervals are reviewed.

6. The method of claim 1, wherein text in the image is normalized.

7. The method of claim 1, wherein the image analysis system uses a training set of data that has been pre-classified for training the image analysis system comprising:
   submitting pre-classified images to the image analysis system;
   adjusting attributes on the pre-classified images;
   adjusting weights to the attributes to create weighted attributes;
   using the weighted attributes in the image analysis system on the pre-classified images;
   determining an accuracy of the image analysis system;
   upon determining that the accuracy of the image analysis system is above a threshold, ending the method; and
   upon determining that the accuracy of the image analysis system is below a threshold, repeating the method.

8. The method of claim 7, further comprising determining a precision of the image analysis system comprising dividing total positive identifications by a number of total positive identifications and total false positive identifications.

9. The method of claim 8, further comprising determining a recall of the image analysis system comprising dividing the total positive identifications by a sum of total positive identifications and total false identifications.

10. The method of claim 9, where the threshold is a number between 0 and 1 and is adjustable to obtain a desired precision and recall.

11. The method of claim 7, wherein the training comprises:
   obtaining n images;
   breaking the n images into y groups;
   learning from the images comprising:
      withholding group x, comprising one group of the y group;
      training a classification system with the y groups excluding group x;
      testing the classification system with group x;
      adding group x to group y; and
      substituting another group y as group x; and
      repeating the learning y times.

12. A tangible computer storage medium physically configured according to computer executable instructions for determining whether an image is a true image or a not found image, the computer executable instructions comprising instructions for:
   accepting the image from a vendor;

submitting the image to an image analysis system wherein the image analysis system determines whether the image is a not found image or a true image comprising:
  accepting the image;
  determining an intensity value for the image;
  determining a color value for the image;
  calculating a standard deviation of intensity values of pixels of a pixel sample window, the pixel sample window a portion of an entire image of the image;
  calculating a standard deviation of intensity values of pixels of the entire image;
  calculating a standard deviation of a color value of the pixels of the pixel sample window;
  calculating a standard deviation of a color value of the pixels of the pixels of the entire image;
  determining an intensity difference wherein the intensity difference comprises a difference between the standard deviation of the intensity values for the pixels in the pixel sample window and for the pixels in the entire image;
  determining a color difference wherein the color difference comprises a difference between the standard deviation of the color value of the pixels in the pixel sample window and for the pixels in the entire image;
  determining a classification value comprising applying weights to image attributes; and
  upon the classification value being under a threshold, classifying the image as the true image;
receiving from the image analysis system a determination of whether the image is a not found image or a true image;
upon the image being determined to be a true image, displaying the image; and
upon the image being determined to be a not found image, refraining from displaying the image.

13. The tangible computer storage medium of claim 12, wherein a pixel sample window is selected from an area that is centered at ½ the height of the window and ½ the width of the entire image and is less than 10% of an area of the entire image and the intensity and color value are calculated for the pixel sample window.

14. The tangible computer storage medium of claim 12, wherein the image analysis system uses a training set of data that has been pre-classified for training the image analysis system comprising:
  submitting pre-classified images to the image analysis system;
  adjusting attributes on the pre-classified images;
  adjusting weights to the attributes to create weighted attributes;
  using the weighted attributes in the image analysis system on the pre-classified images;
  determining an accuracy of the image analysis system;
  upon the accuracy of the image analysis system being above a threshold, ending the method; and
  upon the accuracy of the image analysis system being below a threshold, repeating the method.

15. The tangible computer storage medium of claim 12, further comprising computer executable instructions for determining a precision of the image analysis system comprising:
  dividing total positive identifications by a number of total positive identifications and total false positive identifications; and
determining a recall of the image analysis system comprising:
  dividing the total positive identifications by a sum of total positive identifications and total false identifications.

16. The tangible computer storage medium of claim 12, further comprising computer executable instructions for training the method comprising:
  obtaining n images;
  breaking the n images into y groups;
  learning from the images comprising:
    withholding group x, comprising one group of the y group;
    training a classification system with the y groups excluding group x;
    testing the classification system with group x;
    adding group x to group y;
    substituting another group y as group x; and
    repeating the learning y times.

17. A computer system comprising:
a processor physically configured according to computer executable instructions,
a memory for storing computer executable instructions and an input/output circuit,
  the computer executable instruction comprising determining whether an image is a true image or a not found image, the computer executable instructions comprising instructions for:
accepting the image from a vendor;
submitting the image to an image analysis system wherein the image analysis system determines whether the image is a not found image or a true image comprising:
  accepting the image;
  determining an intensity value for the image;
  determining a color value for the image;
  calculating a standard deviation of intensity values of pixels of the pixel sample window, the pixel sample window a portion of an entire image of the image;
  calculating a standard deviation of intensity values of pixels of the entire image;
  calculating a standard deviation of a color value of the pixels of the pixel sample window;
  calculating a standard deviation of a color value of the pixels for the pixels of the entire image;
  determining an intensity difference wherein the intensity difference comprises a difference between the standard deviation of the intensity values for the pixels in the pixel sample window and for the pixels in the entire image;
  determining a color difference wherein the color difference comprises a difference between the standard deviation of the color value of the pixels in the pixel sample window and for the pixels in the entire image;
  determining a classification value comprising applying weights to image attributes; and
  upon the classification value being under a threshold, classifying the image as the true image;
  receiving from the image analysis system a determination of whether the image is a not found image or a true image;
upon the image being determined to be a true image, displaying the image; and
upon the image being determined to be a not found image, refraining from displaying the image.

* * * * *